US012617151B1

(12) United States Patent
Liu et al.

(10) Patent No.: US 12,617,151 B1
(45) Date of Patent: May 5, 2026

(54) PRINT HEAD ASSEMBLY AND MODELING APPARATUS

(71) Applicant: AtomForm Technology (Shenzhen) Co., Ltd., Shenzhen (CN)

(72) Inventors: Bin Liu, Shenzhen (CN); Jigeng Shang, Shenzhen (CN)

(73) Assignee: AtomForm Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/271,743

(22) Filed: Jul. 16, 2025

(30) Foreign Application Priority Data

Mar. 7, 2025 (CN) .......................... 202510277062.5
Jun. 20, 2025 (CN) .......................... 202521279566.2

(51) Int. Cl.
　B29C 64/209 (2017.01)
　B29C 64/236 (2017.01)
　B33Y 30/00 (2015.01)

(52) U.S. Cl.
　CPC .......... B29C 64/209 (2017.08); B29C 64/236 (2017.08); B33Y 30/00 (2014.12)

(58) Field of Classification Search
　CPC ... B29C 64/227; B29C 64/232; B29C 64/236; B29C 64/205; B29C 64/209; B22F 12/46; B22F 12/47; B22F 12/50; B22F 12/53
　See application file for complete search history.

(56) References Cited

U.S. PATENT DOCUMENTS 10,195,778 B2 * 2/2019 Wolf ..................... B29C 64/118
10,576,693 B2 * 3/2020 Swanson ............... B29C 64/106
11,845,227 B2 * 12/2023 LeFevre .................. B22F 10/22
11,878,465 B2 * 1/2024 Pino ...................... B29C 64/227
2016/0236408 A1 * 8/2016 Wolf ..................... B29C 64/118
(Continued)

FOREIGN PATENT DOCUMENTS

CN 207564972 U 7/2018
CN 110641015 A 1/2020
(Continued)

OTHER PUBLICATIONS

English Translation for Yang et al. (CN 116638759) (Year: 2023).*
DE 202025104140.5, search report dated Dec. 18, 2025.
DE 20 2025 104 419.6, search report dated Feb. 27, 2026.

*Primary Examiner* — Seyed Masoud Malekzadeh
(74) *Attorney, Agent, or Firm* — IPro, PLLC

(57) ABSTRACT

Disclosed is a print head assembly and a modeling apparatus, where the print head assembly is applied to the modeling apparatus, and the modeling apparatus includes a drive unit and a working platform; the print head assembly is connected to the drive unit and is configured to, when driven by the drive unit, generate a relative displacement with respect to the working platform; the print head assembly includes a mounting portion and an expansion module, where the mounting portion includes a first guide member extending along a first direction, the expansion module includes a second guide member extending along the first direction, and the first guide member and the second guide member are capable of being engaged with each other; and the print head assembly further includes a locking mechanism. The present application can improve installation firmness of the expansion module on the print head assembly in the modeling apparatus.

13 Claims, 5 Drawing Sheets

(56) References Cited

U.S. PATENT DOCUMENTS

| | | | |
|---|---|---|---|
| 2018/0043627 A1 | 2/2018 | Barclay et al. | |
| 2020/0262143 A1* | 8/2020 | Gibson | B29C 64/209 |
| 2023/0166448 A1* | 6/2023 | Pino | B29C 64/227 |
| | | | 425/375 |
| 2023/0173749 A1* | 6/2023 | Houwing | B33Y 10/00 |
| | | | 264/308 |
| 2024/0123679 A1* | 4/2024 | Pino | B29C 64/25 |

FOREIGN PATENT DOCUMENTS

| | | | | |
|---|---|---|---|---|
| CN | 113650296 A | | 11/2021 | |
| CN | 116638759 A | * | 8/2023 | B29C 64/20 |
| CN | 223354965 U | | 9/2025 | |
| DE | 102022204255 A1 | | 11/2023 | |

* cited by examiner

PRINT HEAD ASSEMBLY AND MODELING APPARATUS

CROSS-REFERENCE TO RELATED APPLICATIONS

The present application claims priority to Chinese Patent Application No. 202510277062.5, filed with the China National Intellectual Property Administration on Mar. 7, 2025 and entitled "PRINT HEAD ASSEMBLY, FILTER ASSEMBLY, CUTTING MODULE, WRITING MODULE, AND MODELING APPARATUS", and Chinese Patent Application No. 202521279566.2, filed with the China National Intellectual Property Administration on Jun. 20, 2025 and entitled "PRINT HEAD ASSEMBLY AND MODELING APPARATUS", which are incorporated herein by reference in their entirety.

TECHNICAL FIELD

The present application relates to the technical field of 3D printing, and in particular, to a print head assembly and a modeling apparatus.

BACKGROUND 3D printing apparatuses represent a category of rapid modeling apparatus. The most commonly used 3D printing technology at present is Fused Deposition Modeling (FDM), which, based on a digital model, operates by heating materials such as plastics to a molten state and extruding them through an extrusion head, followed by constructing a three-dimensional object through layer-by-layer printing.

To expand the application scope of the aforementioned modeling apparatus, various types of expansion modules such as a laser module, a cutting module, or a writing module may be mounted on either a print head assembly or a drive unit.

The expansion module may be connected to the print head assembly via threaded fasteners such as bolts, for example, a plurality of threaded holes may be formed in a main frame of the print head assembly, while a plurality of corresponding through-holes are formed in the expansion module, thereby enabling fixation of the expansion module onto the main frame by inserting the bolts through the through-holes into the threaded holes.

In some embodiments, the expansion module may be connected through magnetic attraction. A magnet may be arranged on the expansion module and/or the main frame, such that the expansion module is fixed onto the main frame by the magnet's force of attraction. This mounting approach is simple and easy to operate. However, magnetic attraction typically provides insufficient stability, posing a risk of detachment when the print head assembly moves rapidly or is subjected to an external force.

In conclusion, how to securely fasten the expansion module to the print head assembly remains a critical problem to be solved.

SUMMARY

An embodiment of the present application provides a print head assembly and a modeling apparatus, which are capable of improving installation firmness of the expansion module on the print head assembly.

The technical solution of this embodiment of the present application is implemented as follows:

In a first aspect, a print head assembly applied to a modeling apparatus is provided, where the modeling apparatus includes a drive unit and a working platform; the print head assembly is connected to the drive unit and is configured to, when driven by the drive unit, generate a relative displacement with respect to the working platform; the print head assembly includes a mounting portion and an expansion module, where the mounting portion includes at least one first guide member extending along a first direction, the expansion module includes at least one second guide member extending along the first direction, and the first guide member and the second guide member are capable of being engaged with each other along the first direction; and the print head assembly further includes a locking mechanism configured to, when the first guide member and the second guide member are engaged with each other, provide a force for bringing the mounting portion and the expansion module closer to or separating them from each other, so as to restrict movement of the expansion module along a second direction perpendicular to the first direction.

By arranging the guide members capable of being engaged with each other respectively on the mounting portion and on the expansion module of the print head assembly and the locking mechanism, the aforementioned technical solution provided by the present application, after moving the expansion module along the guide member to an installation position, causes the guide members on the mounting portion and the expansion module to fit closely through the locking mechanism, thereby eliminating sliding gaps between the guide members and enabling both convenient installation and secure connection.

In some embodiments, the locking mechanism includes at least one eccentric wheel handle assembly, where the eccentric wheel handle assembly includes an eccentric wheel rotatably connected to the expansion module and a handle fixedly connected to the eccentric wheel.

According to the above technical means, the locking mechanism is configured as the eccentric wheel handle assembly, which utilizes its eccentric characteristic to generate a thrust force during rotation, thereby achieving reliable locking between the first guide member and the second guide member, where the handle in the eccentric wheel handle assembly extends a force arm, consequently enhancing operational convenience for users.

In some embodiments, the mounting portion further includes a positioning unit, where the positioning unit includes a first stop member and/or at least one snap-fit structure, where the first stop member includes a blocking plate disposed at an end of the mounting portion along the first direction; and the snap-fit structure includes a first snap formed on the mounting portion and a second snap formed on the expansion module, where when the expansion module slides along the first direction to the end of the mounting portion under a constraint of the first guide member and the second guide member, the first snap and the second snap are engaged with each other.

According to the above technical means, the positioning unit is configured to achieve precise installation and positioning of the expansion module, thereby preventing excessive sliding of the module. The snap-fit structure provides mechanical stopping functionality, which can enhance module connection strength and reduce shaking.

In some embodiments, when the expansion module slides along the first direction under the constraint of the first guide member and the second guide member until the first snap and the second snap are engaged with each other, the locking mechanism is used to lock the expansion module with the mounting portion.

According to the above technical means, the first snap and the second snap are capable of being engaged with each other during manual installation of the expansion module, thereby achieving positioning of the expansion module while producing an obvious force variation that enables users to perceive that the module has been installed properly in place.

In some embodiments, the first snap is a female snap and the second snap is a male snap.

According to the above technical means, the male-female snap-fit structure can enhance the engagement reliability of snap-fit connection.

In some embodiments, the first direction is a Z-axis direction of the modeling apparatus.

According to the above technical means, the expansion module may be installed along the Z-axis direction of the molding apparatus.

In some embodiments, the mounting portion is provided with the first guide member in a quantity of two arranged at intervals along an X-axis direction, and the expansion module is provided with the second guide member in a quantity of two arranged at intervals along the X-axis direction; or the mounting portion is provided with the first guide member in a quantity of two arranged at intervals along a Y-axis direction, and the expansion module is provided with the second guide member in a quantity of two arranged at intervals along the Y-axis direction.

According to the above technical means, the two first guide members and the two second guide members arranged at intervals along the X-axis or Y-axis direction can further reduce shaking of the expansion module.

In some embodiments, the print head assembly further includes two or more extrusion heads connected to the drive unit, and the mounting portion is arranged on the extrusion heads.

According to the above technical means, the present application can solve the problems of "cumbersome operational procedures for a single-extrusion-head 3D printing apparatus requiring removal of the extrusion head for material replacement since such printing apparatus can typically perform only single-material printing" and "increased operational difficulty in necessary post-replacement position calibration procedures for a new extrusion head to avoid severely compromising printing precision".

In some embodiments, the two extrusion heads include a first extrusion head and a second extrusion head, where the first extrusion head and the second extrusion head have different nozzle diameters, and/or the first extrusion head and the second extrusion head are configured to print different filaments, where the different filaments include filaments of different colors and/or filaments of different materials.

According to the above technical means, the differentiated configurations between the first extrusion head and the second extrusion head enable a 3D printing apparatus to: execute printing operations with varying precision requirements, and easily achieve multi-color printing functionality that adds rich color gradation to printed products. Through the differentiated configurations, the 3D printing apparatus can adapt to a wider range of application scenarios.

In some embodiments, the two extrusion heads include a first extrusion head and a second extrusion head, and the print head assembly further includes a main frame, where the first extrusion head is fixedly connected to the main frame, and the second extrusion head is movably connected to the main frame.

According to the above technical means, the present application can solve the problems of "cumbersome operational procedures for a single-extrusion-head 3D printing apparatus requiring removal of the extrusion head for material replacement since such printing apparatus can typically perform only single-material printing" and "increased operational difficulty in necessary post-replacement position calibration procedures for a new extrusion head to avoid severely compromising printing precision".

In some embodiments, the second extrusion head moves along a Z-axis direction to cause a nozzle height of the second extrusion head to be greater than a nozzle height of the first extrusion head, so as to enable printing using the first extrusion head.

According to the above technical means, the second extrusion head can move to a position above the first extrusion head during operation of the first extrusion head, thereby preventing collision between the second extrusion head and a printed product on the printing platform during operation of the first extrusion head.

In some embodiments, the second extrusion head moves along a Z-axis direction to cause a nozzle height of the second extrusion head to be less than a nozzle height of the first extrusion head, so as to enable printing using the second extrusion head.

According to the above technical means, when extrusion head switching is required, the second extrusion head is controlled to move downward until its nozzle height is less than the nozzle height of the first extrusion head, thereby enabling printing using the second extrusion head.

In some embodiments, the drive unit includes a motor and a synchronous belt, where the motor is configured to drive movement of the synchronous belt arranged along different directions, thereby driving the print head assembly to generate the relative displacement with respect to the working platform.

According to the above technical means, the print head can move along multiple directions.

In a second aspect, a modeling apparatus is provided, including the print head assembly according to any one of the embodiments in the first aspect.

According to the above technical means, the modeling apparatus employs a modular design, supporting rapid replacement of functional modules and thereby enabling the modeling apparatus to adapt to diversified processing requirements. During replacement of the expansion module, the mutual engagement between the guide members combined with the locking action of the locking mechanism ensures both convenient replacement and secure connection of the expansion module.

In some embodiments, the expansion module is a laser module, and the drive unit is configured to drive the laser module to move on a horizontal plane for cutting and/or engraving a material.

According to the above technical means, the drive unit disposed on the print head assembly can precisely control movement of the laser module to cut and/or engrave a material from different horizontal positions, thereby producing complex patterns of various shapes.

In some embodiments, a rotary device is arranged on the working platform and is configured to drive rotation of a rotary body or an object with an irregular surface.

According to the above technical means, the present application can achieve efficient processing operations such as cutting or engraving on irregularly-shaped objects, thereby significantly expanding the processing capabilities of the 3D printing apparatus.

In some embodiments, the laser module emits a laser beam to irradiate the material, so as to cause the material to melt, vaporize, or reach an ignition point, where a molten or ignited material is removable by an air flow coaxial with the laser beam.

According to the above technical means, a high-velocity air flow coaxial with the laser beam may be employed to remove the molten or ignited material.

In some embodiments, the expansion module is a cutting module driven by the drive unit to move along a target path for cutting a to-be-cut material.

According to the above technical means, the cutting module is capable of, when driven by the drive unit, moving along a target path, thereby forming a preset pattern on a to-be-cut material.

In some embodiments, the to-be-cut material is adhered to the working platform; or the modeling apparatus further includes a cutting platform configured to position the to-be-cut material.

According to the above technical means, the cutting module can be configured to cut materials such as paper, films, or stickers.

In some embodiments, the expansion module is a writing module and is provided with a clamping portion for fixing a writing instrument.

According to the above technical means, the clamping portion of the writing instrument disposed on the expansion module enables the writing module to hold various types of writing instruments, for example, hard-tip instruments such as pencils or ballpoint pens, or soft-tip instruments such as brushes or felt-tip pens, thereby facilitating users in achieving diversified artistic effects and styles.

Figure 1:
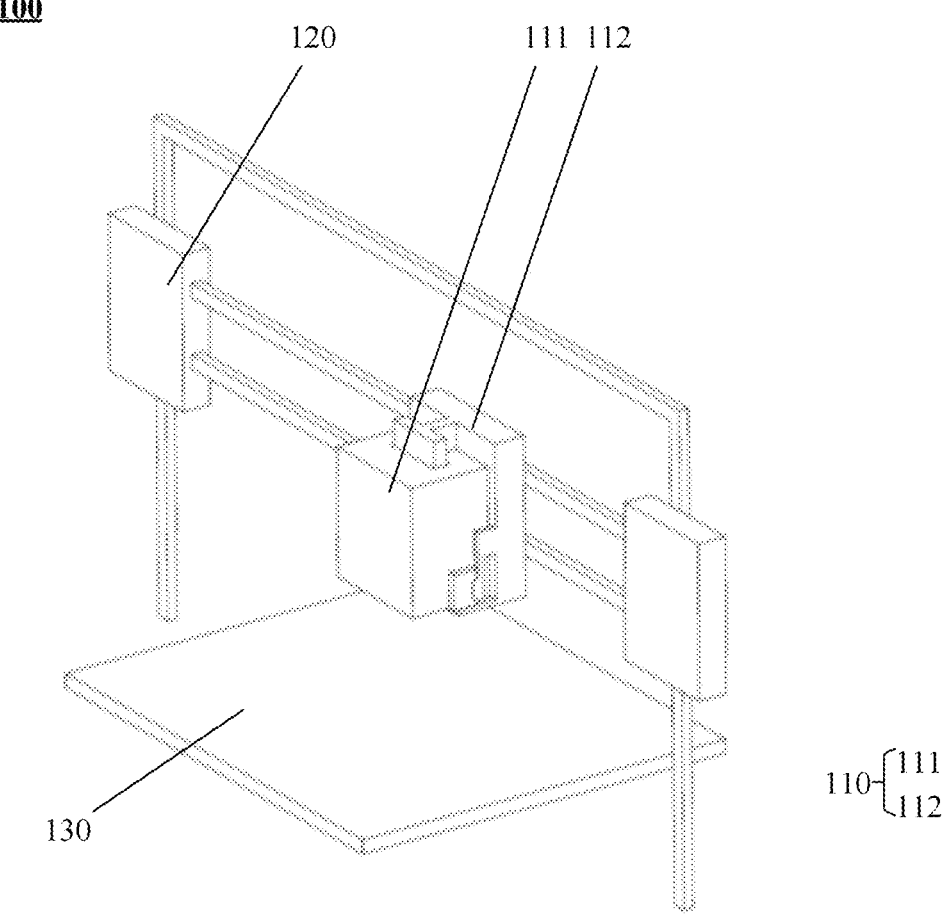
FIG. 1 is a schematic structural diagram of a modeling apparatus according to an embodiment of the present application.

Reference signs used in the figures are as follows:

100: modeling apparatus; 110: print head assembly; 111: expansion module; 1111: second guide member; 11111: third side surface; 11112: fourth side surface; 1112: second engagement surface; 1113: shaft; 112: mounting portion; 1121: first guide member; 11211: first side surface; 11212: second side surface; 1122: first engagement surface; 1123: positioning unit; 1124: first stop member; 11241: blocking plate; 1125: snap-fit structure; 11251: first snap; 11252: second snap; 11253: flange; 11254: groove; 113: eccentric wheel handle assembly; 1131: eccentric wheel; 1132: handle; 1133: bearing; 120: drive unit; and 130: working platform.

DETAILED DESCRIPTION OF THE EMBODIMENTS

To make the objectives, technical solutions, and advantages of the present application clearer, the following further describes the present application in detail with reference to the accompanying drawings. The described embodiments should not be considered as limiting the present application, and all other embodiments obtained by those of ordinary skill in the art without making creative efforts shall fall within the protection scope of the present application.

In the following description, reference is made to "some embodiments", which describe a subset of all possible embodiments; however, it will be understood that "some embodiments" may be the same subset or different subsets of all possible embodiments and may be combined with each other without conflict.

In the following description, the terms "first\second\third" involved are merely used to distinguish similar objects and do not represent a specific ordering of the objects. It can be understood that "first\second\third" can be interchanged with a specific order or sequence where permitted, so that the embodiments of the present application described herein can be implemented in an order other than that illustrated or described herein.

Unless otherwise defined, all technical and scientific terms used herein have the same meanings as those commonly understood by those skilled in the art of the present application. The terms used herein are only for the purpose of describing the embodiments of the present application and are not intended to limit the present application.

Before further describing the embodiments of the present application in detail, it is necessary to first elaborate on problems existing in a 3D printing apparatus.

3D printing apparatuses, also referred to as three-dimensional printers or stereoscopic printers, represent a type of processing apparatus with rapid modeling capabilities, which plays a critical role across multiple industries including modern manufacturing and design fields.

The most commonly used 3D printing technology at present is Fused Deposition Modeling (FDM), which, based on a digital model, operates by heating materials such as plastics to a molten state and extruding them through an extrusion head, followed by constructing three-dimensional objects through layer-by-layer stacking.

The print head assembly is one of the critical components of a 3D printing apparatus, including an extrusion head configured to, when driven by a drive unit, generate a relative displacement with respect to a printing platform; and the extrusion head typically includes a heating assembly and a nozzle, where the heating assembly is configured to heat printing materials to a molten state, and the nozzle is configured to extrude molten materials to perform model printing on the printing platform.

For a single-extrusion-head 3D printing apparatus, during a printing operation, fixed parameters such as nozzle diameter and temperature of the extrusion head typically restrict the apparatus to single-material printing, and material replacement necessitates removal of the extrusion head, resulting in cumbersome operational procedures; furthermore, post-replacement position calibration is required for a new extrusion head to avoid severely compromising printing precision, thereby increasing operational difficulty.

To solve the aforementioned problems, a print head assembly may be provided with a plurality of extrusion heads, or an extrusion head is configured to be capable of automated replacement.

For example, a print head assembly is provided with a plurality of extrusion heads, where the extrusion heads include a first extrusion head and a second extrusion head. The print head assembly further includes a main frame configured to connect the extrusion heads to a drive unit of a 3D printer. For the dual-extrusion-head print head assembly, both the extrusion heads are connected to the main frame, where the first extrusion head is fixedly connected to the main frame, therefore also referred to as the "fixed extrusion head"; and the second extrusion head is movably connected to the main frame, therefore also referred to as the "movable extrusion head", and can be displaced along a Z-axis direction. The second extrusion head can move to a position above the first extrusion head during operation of the first extrusion head, thereby preventing collision between the second extrusion head and a printed product on the printing platform during operation of the first extrusion head; and when extrusion head switching is required, the second extrusion head is controlled to move downward until its nozzle height is less than the nozzle height of the first extrusion head, thereby enabling printing using the second extrusion head.

The first extrusion head and the second extrusion head may differ in multiple aspects, for example: the first extrusion head and the second extrusion head may differ in nozzle diameter, such as a nozzle diameter of 0.2 mm for the first extrusion head and a nozzle diameter of 0.4 mm for the second extrusion head, thereby enabling a 3D printing apparatus to execute printing operations with varying precision requirements. The first extrusion head with a smaller nozzle diameter may be selected for achieving high-precision and detail-intensive printing effects, while the second extrusion head with a larger nozzle diameter may be selected for achieving rapid modeling or printing larger-scale objects; or the two extrusion heads may be respectively configured to print differently colored filaments, enabling a 3D printing apparatus to easily achieve multi-color printing functionality that adds rich color gradation to printed products; or the two extrusion heads may be configured to print different filaments, for example, the first extrusion head is configured to print ABS materials exhibiting good strength and heat resistance, while the second extrusion head is configured to print PLA materials offering advantages such as environmental friendliness and easy processing. Through the differentiated configurations, the 3D printing apparatus can adapt to a wider range of application scenarios.

As another possible implementation manner, the 3D printing apparatus may be provided with an extrusion head storage zone housing the plurality of extrusion heads.

During extrusion head replacement, the drive unit drives the print head assembly to move to the extrusion head storage zone where an auxiliary apparatus such as a robotic arm removes the current extrusion head from the print head assembly, or the print head assembly may be configured for automated removal of the extrusion head. Subsequently, a to-be-installed extrusion head is installed on the print head assembly. Upon completion of the replacement, the drive unit drives the print head assembly to move from the extrusion head storage zone to a working area while performing calibration on the newly installed extrusion head.

To extend the functionality of the 3D printing apparatus for broader applications, the print head assembly may be provided with some expansion modules including, but not limited to, a laser module, a cutting module, and a writing module. These expansion modules are configured to be driven by the drive unit of the 3D printing apparatus to move, thereby achieving functions such as laser engraving, cutting, writing, and drawing.

Taking the laser module as an example, it may emit a high-power-density laser beam to irradiate a material, causing rapid melting, vaporization, or ignition of the material, while utilizing a high-velocity air flow coaxial with the laser beam to remove the molten or ignited material. When applied in the 3D printing apparatus, the laser module may execute complex motions through the drive unit's actuation capability to achieve various functions. For example, by placing a common material such as paper or wooden board on the printing platform and accurately driving the laser module to move on a horizontal plane, it is capable of achieving precise cutting of the material and cut out various complex shapes and patterns; as another example, simultaneous control of laser focus when the laser module is driven to move enables internal engraving within a transparent material such as glass or acrylic; also for example, a rotary device can be arranged on the printing platform to drive a rotary body or an object with an irregular surface to rotate, which, combined with the laser module's movement, enables efficient processing operations such as cutting or engraving on irregularly-shaped objects, thereby significantly expanding the processing capabilities of 3D printing apparatus.

The cutting module can be configured to cut materials such as paper, films, or stickers. During cutting operations, a to-be-cut material may either be closely adhered to the printing platform of the printing apparatus or positioned on a dedicated cutting platform, and the cutting module is capable of, when driven by the drive unit, moving along a target path, thereby forming a preset pattern on the to-be-cut material.

When configured as a writing module, the expansion module enables functional expansion of the 3D printing apparatus to an automated writing machine (also called a writing robot). The writing module is provided with a clamping portion of a writing instrument so that users can attach various types of writing instruments (e.g., hard-tip instruments such as pencils or ballpoint pens, or soft-tip instruments such as brushes or felt-tip pens) to the writing module. These instruments are driven by the drive unit to execute writing or drawing functions on paper or drawing boards.

In the related art, there are many ways to install the expansion module.

The expansion module may be connected to the print head assembly via threaded fasteners such as bolts; more specifically, a plurality of threaded holes may be formed in a main frame of the print head assembly, while a plurality of corresponding through-holes are formed in the expansion module, thereby enabling fixation of the expansion module onto the main frame by inserting the bolts through the through-holes into the threaded holes. Although this bolted connection way ensures firm fastening without shaking, reliable installation typically requires at least three bolts, complicating the installation process.

The expansion module may also be connected through magnetic attraction. A magnet may be arranged on the expansion module and/or the main frame, such that the expansion module is fixed onto the main frame by the magnet's force of attraction. This configuration offers simple installation and operational convenience. However, magnetic attraction typically provides insufficient stability, posing a risk of detachment when the print head assembly moves rapidly or is subjected to an external force.

In view of the aforementioned problems, embodiments of the present application provide a print head assembly and a modeling apparatus. The technical solutions of the present application will be described in detail below with reference to the accompanying drawings.

Some embodiments of the present application first provide a print head assembly applied to a modeling apparatus.

Figure 2:
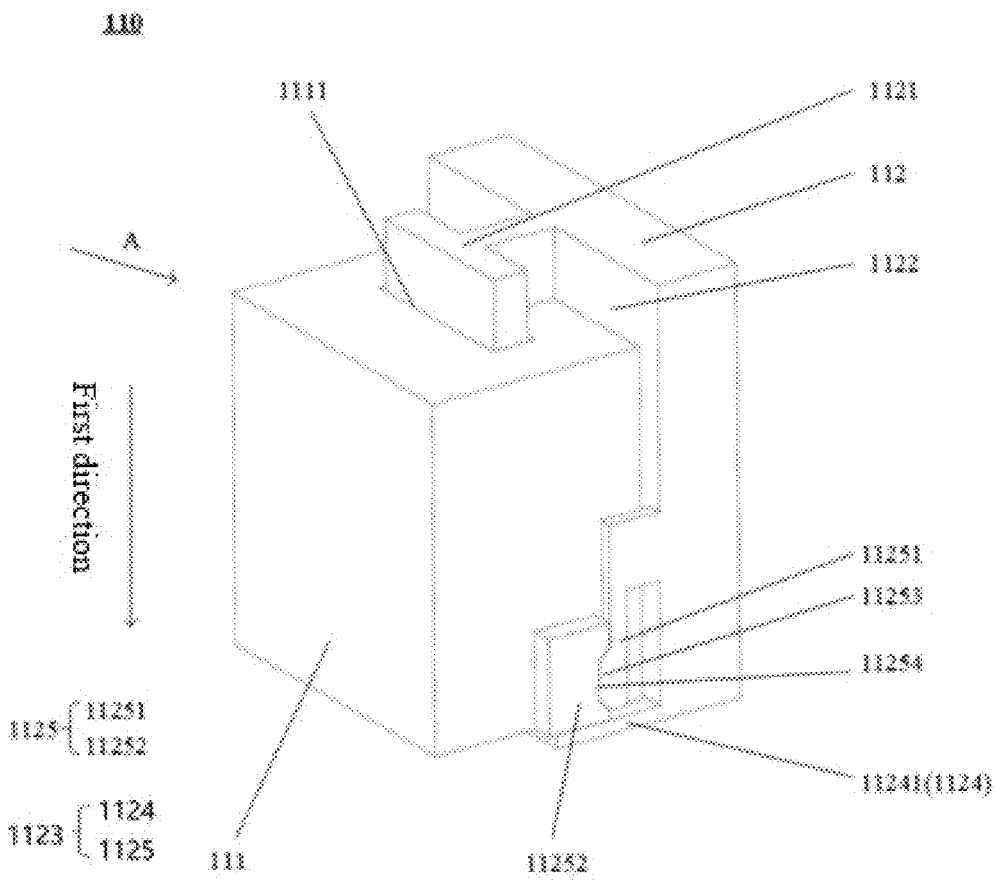
FIG. 2 is a schematic diagram of a partial structure of a print head assembly in FIG. 1.
Figure 3:
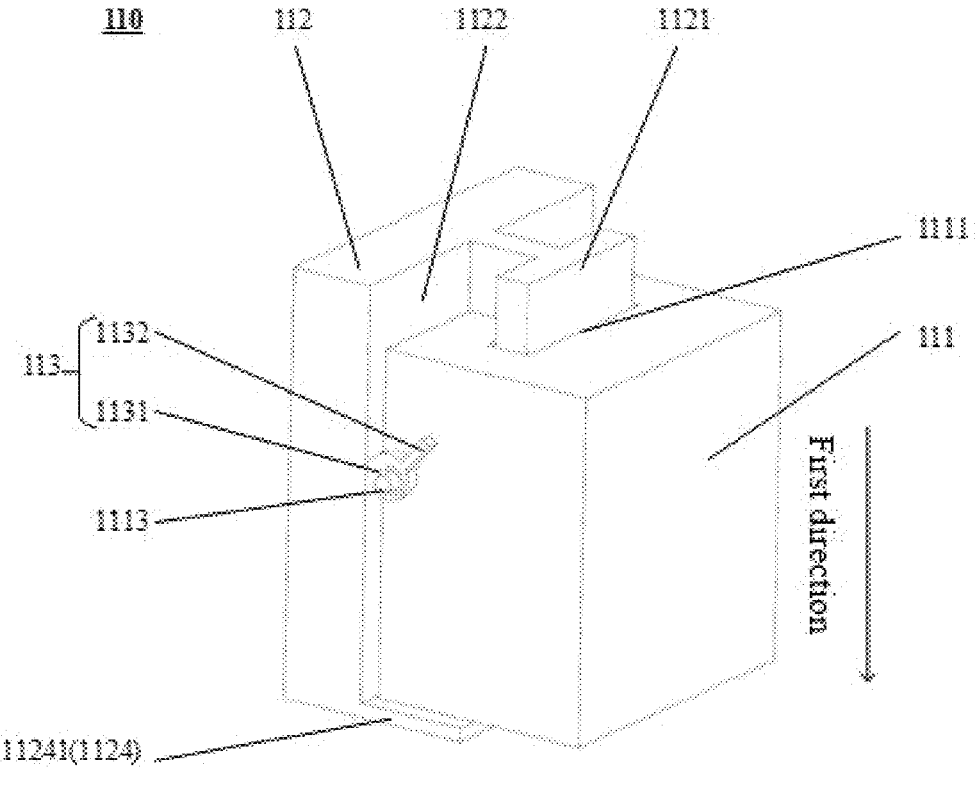
FIG. 3 is an A-directional view of FIG. 2.
Figure 4:
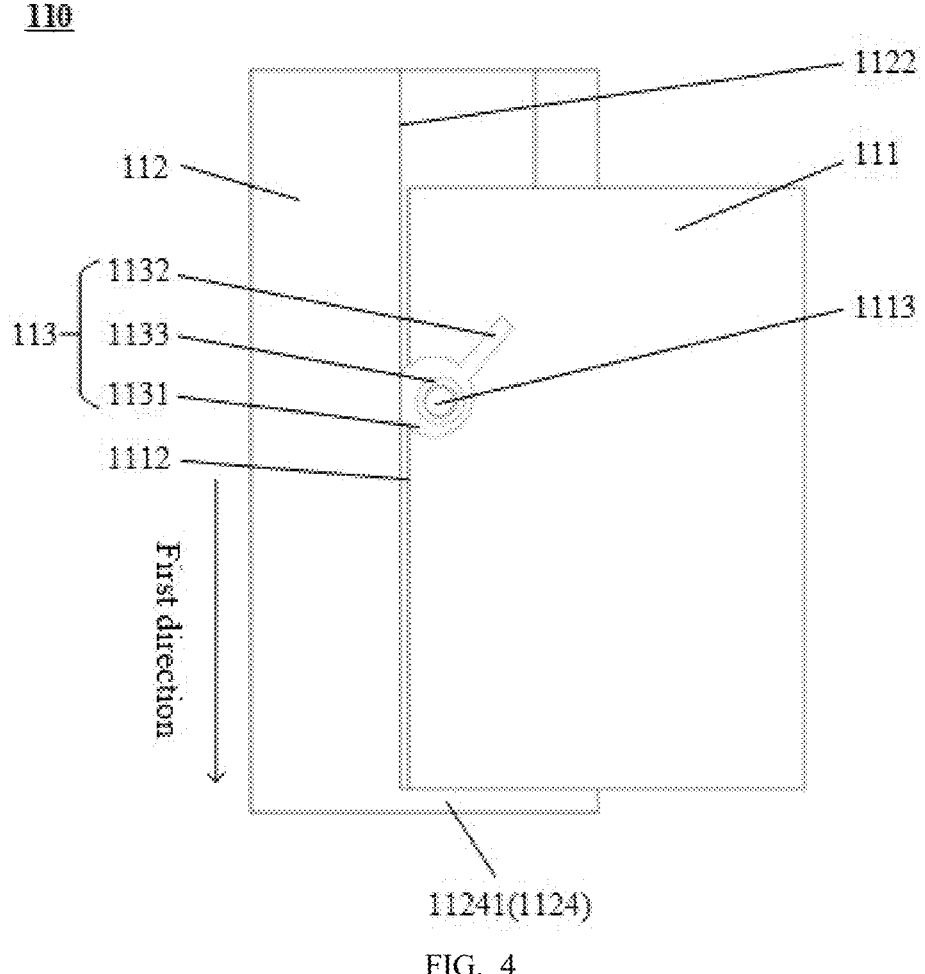
FIG. 4 is a side view of FIG. 2.

FIG. 1 is a schematic structural diagram of the modeling apparatus according to this embodiment of the present application; FIG. 2 is an enlarged view of the print head assembly; and FIGS. 3 and 4 are an A-directional view and a side view of FIG. 2, respectively.

The modeling apparatus 100 in FIG. 1 includes a print head assembly 110, a drive unit 120, and a working platform 130.

The print head assembly 110 is connected to the drive unit 120 and is configured to, when driven by the drive unit 120, generate a relative displacement with respect to the working platform 130, so as to perform operations such as 3D printing, engraving, and cutting on the working platform 130.

The drive unit 120 may be configured in various forms. For example, the drive unit 120 may include a motor and a plurality of lead screws, where the plurality of lead screws are respectively arranged along the X-axis, Y-axis, and Z-axis; the motor is configured to drive rotation of the lead screws, enabling lead screw nuts to move along axial directions of the lead screws, thereby driving the print head assembly 110 to move along the X-axis, Y-axis, and Z-axis; or the drive unit 120 may include components such as a motor and a synchronous belt, where the motor drives rotation of a pulley to consequently drive the synchronous belt to move. By arranging the synchronous belt transmission mechanism along different directions, multi-directional movement of the print head assembly is achieved.

Also referring to FIGS. 1-3, the print head assembly 110 includes an expansion module 111 and a mounting portion 112.

In this embodiment of the present application, the expansion module 111 may also be referred to as a functional module, an add-on module, or an extension module.

The expansion module 111 may be the aforementioned laser module, cutting module, or writing module, or may also be a milling module, engraving module, etc., which is not specifically limited in this embodiment of the present application.

The mounting portion 112 may be a main frame of the print head assembly 110, which is configured to mount the extrusion heads. That is to say, both the expansion module 111 and the extrusion heads are mounted on the main frame. In some embodiments, in some implementation manners where the extrusion heads are directly connected to the drive unit 120 of a 3D printer, the mounting portion 112 may be arranged on the extrusion heads.

The mounting portion 112 includes a first guide member 1121, and the expansion module 111 is provided with a second guide member 1111. The first guide member 1121 and the second guide member 1111 both extend along a first direction, and the first direction is an installation direction of the expansion module 111.

In the example of FIG. 1, the first direction is consistent with the Z-axis direction of the modeling apparatus 100. That is to say, the expansion module 111 may be installed along the Z-axis direction of the modeling apparatus 100. As one possible implementation manner, the first direction may also be consistent with the X-axis or Y-axis direction.

That is to say, the expansion module 111 may also be installed along a front-to-back direction or left-to-right direction of the modeling apparatus 100.

Further referring to FIG. 1, the first guide member 1121 protrudes outward from a first engagement surface 1122 of the mounting portion 112. The first guide member 1121 may also be referred to as a guide slide rail. Correspondingly, the second guide member 1111 constitutes a guide groove formed by an inward recess from a second engagement surface 1112 of the expansion module 111. The first engagement surface 1122 and the second engagement surface 1112 respectively represent mutually fitting surfaces of the mounting portion 112 and the expansion module 111.

As shown in FIG. 1, the cross-sections of the first guide member 1121 and the second guide member 1111 are T-shaped, where the first guide member 1121 forms a protruding T-shaped rail structure and the second guide member 1111 forms a T-shaped guide groove 11254. This configuration enables mutual engagement between the first guide member 1121 and the second guide member 1111, thereby providing a constraint for the expansion module 111 along directions other than the first direction.

It can be understood that the aforementioned T-shaped cross-sections of the first guide member 1121 and the second guide member 1111 are merely exemplary, and the cross-sections of the first guide member 1121 and the second guide member 1111 may also be trapezoidal, Y-shaped, or other shapes, which is not limited in this embodiment of the present application.

It can also be understood that this embodiment of the present application does not limit the number of the first guide member 1121 and the second guide member 1111 described above. The one first guide member 1121 and the one second guide member 1111 shown in FIG. 1 are merely examples, and the number of the first guide member 1121 and the second guide member 1111 may be plural. For example, two first guide members 1121 and two second guide members 1111 may be arranged at intervals along the X-axis or Y-axis direction, which can reduce shaking of the expansion module 111 to a certain extent.

It should also be noted that this embodiment of the present application does not specifically limit the forming direction of the first guide member 1121 and the second guide member 1111.

The first guide member 1121 formed by protruding outward and the second guide member 1111 formed by an inward recess, as shown in FIG. 1, are merely exemplary. As another implementation manner, the first guide member 1121 may be a groove 11254 formed on the mounting portion 112, and the second guide member 1111 may be a protruding rail structure formed on the expansion module 111.

The print head assembly 110 further includes a locking mechanism configured to, when the first guide member 1121 and the second guide member 1111 are engaged with each other, provide a force for bringing the mounting portion 112 and the expansion module 111 closer to or separating them from each other, enabling the first guide member 1121 and the second guide member 1111 to fit closely.

The locking mechanism may be arranged either on the expansion module 111 or on the mounting portion 112.

For example, the locking mechanism is arranged on the mounting portion 112. After the expansion module 111 is installed in place along the first direction, the locking mechanism locks the expansion module 111 to the mounting portion 112, thereby providing a constraint for the expansion module 111.

The locking mechanism 113 is capable of providing a force for bringing the mounting portion 112 and the expansion module 111 closer to or separating them from each other, enabling the first guide member 1121 and the second guide member 1111 to fit closely, eliminating gap therebetween, and preventing shaking of the expansion module 111.

The locking mechanism 113 may be an automatic locking mechanism or a manual locking mechanism.

For the automatic locking mechanism, it may be implemented based on a mechanical mechanism. For example, an elastic member may be arranged on a side of the mounting portion 112 close to the expansion module 111, where the elastic member is capable of abutting against the expansion module 111 after the expansion module 111 is installed in place, thereby providing a force for pushing the expansion module 111 away from the mounting portion 112, enabling the first guide member 1121 and the second guide member 1111 to fit closely. In some embodiments, the automatic locking mechanism may be implemented based on an automatic control method. For example, an electric push rod or an electric pull rod may be arranged in the mounting portion 112, such that after the mounting portion 112 is installed in place, the electric push rod or electric pull rod drives the expansion module 111 to move away from the mounting portion 112, thereby eliminating gap between the first guide member 1121 and the second guide member 1111.

For the manual locking mechanism, it may be, for example, a buckle. After the expansion module 111 is installed in place, users may fasten the buckle to eliminate gap between the first guide member 1121 and the second guide member 1111.

According to the above technical means, by arranging the guide members capable of being engaged with each other respectively on the mounting portion 112 and on the expansion module 111 of the print head assembly 110 and the locking mechanism, after moving the expansion module 111 along the extension direction of the guide member to an installation position, the guide members on the mounting portion 112 and the expansion module 111 are caused to fit closely through the locking mechanism, thereby eliminating sliding gaps and enabling both convenient installation and secure connection.

Figure 5:
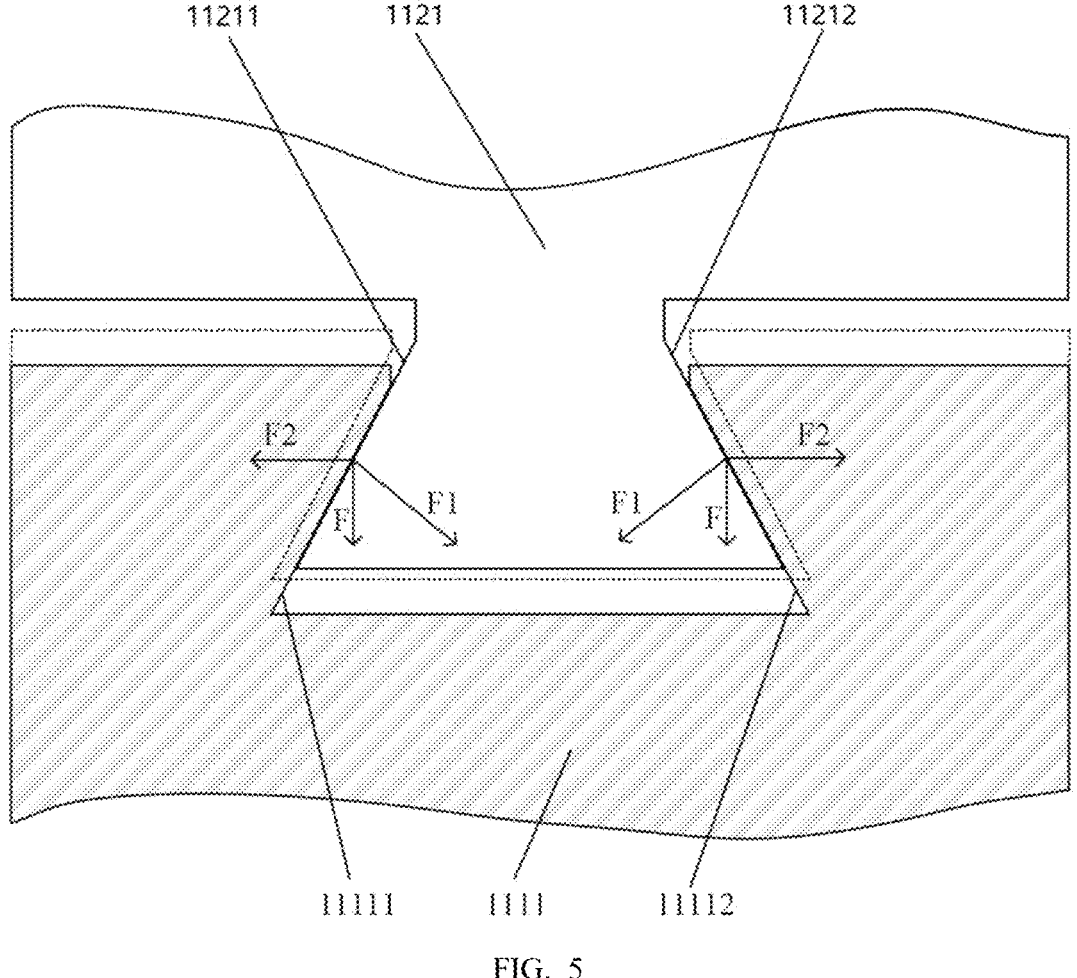
FIG. 5 is a schematic sectional view of a first guide member and a second guide member according to an embodiment of the present application.

FIG. 5 illustrates one possible implementation manner of the first guide member 1121 and the second guide member 1111. As shown in FIG. 5, the cross-sections of the first guide member 1121 and the second guide member 1111 are trapezoidal. The first guide member 1121 has opposing first side surface 11211 and second side surface 11212, while the second guide member 1111 has opposing third side surface 11111 and fourth side surface 11112. When the first guide member 1121 and the second guide member 1111 are engaged with each other, the first side surface 11211 approaches the third side surface 11111, and the second side surface 11212 approaches the fourth side surface 11112, with the mutually approaching two surfaces being parallel to each other; meanwhile, to ensure that the first guide member 1121 and the second guide member 1111 can slide relatively, the mutually approaching two surfaces do not fit closely.

The dashed lines in FIG. 5 illustrate a state where the first guide member 1121 and the second guide member 1111 fit closely. When the locking mechanism applies a force to separate the first guide member 1121 and the second guide member 1111 from each other, since the aforementioned side surfaces are inclined, the thrust force F provided by the locking mechanism is resolved into a first component force F1 perpendicular to the inclined side surfaces and a second component force F2 oriented outward along a horizontal direction, where the first component force F1 perpendicular to the inclined side surfaces causes the adjacent side surfaces to fit closely, while the second component force F2 in the horizontal direction ensures that the first guide member 1121 and the second guide member 1111 are constrained horizontally.

In some embodiments, the locking mechanism may be an eccentric wheel handle assembly 113 as indicated in FIGS. 3 and 4.

In some embodiments, the eccentric wheel handle assembly 113 may be arranged on the expansion module 111.

The eccentric wheel handle assembly 113 includes an eccentric wheel 1131 and a handle 1132 fixedly connected to the eccentric wheel 1131, where the handle 1132 is secured to an outer side of the eccentric wheel 1131 along a diametrical direction of the eccentric wheel 1131; and the eccentric wheel 1131 is rotatably connected to the expansion module 111, with a deviation existing between a rotation center thereof and a geometric center of an outer periphery of the eccentric wheel 1131, where a distance between the rotation center and the geometric center constitutes an eccentric distance of the eccentric wheel 1131. The eccentric wheel handle assembly 113 is also referred to as a locking cam.

When the handle 1132 is rotated, the outer periphery of the eccentric wheel 1131 approaches and ultimately abuts against a surface of the mounting portion 112 close to the expansion module 111 (i.e., the aforementioned first engagement surface 1122), thereby applying a thrust force to the expansion module 111 away from the mounting portion 112, enabling the first guide member 1121 and the second guide member 1111 to fit closely. Simultaneously, friction between the outer periphery of the eccentric wheel 1131 and the mounting portion 112 further locks the expansion module 111 in place, thereby enhancing installation firmness.

It can be understood that, in order to avoid jamming during insertion of the expansion module 111 along the first direction, a certain gap inevitably exists between the first guide member 1121 and the second guide member 1111. The aforementioned eccentric wheel handle assembly 113 applies a thrust force to enable close fitting between the first guide member 1121 and the second guide member 1111, thereby eliminating sliding gaps and improving installation accuracy.

According to the above technical means, the locking mechanism is configured as the eccentric wheel handle assembly 113, which utilizes its eccentric characteristic to generate a thrust force during rotation, thereby achieving reliable locking between the mounting portion 112 and the expansion modules 111, where the handle 1132 in the eccentric wheel handle assembly 113 extends a force arm, consequently enhancing operational convenience for users.

In some embodiments, the outer periphery of the eccentric wheel 1131 is covered with an elastically deformable material. For example, the outer periphery of the eccentric wheel 1131 may be rubber-coated or have an elastic material such as rubber attached to its outer surface. Such materials are capable of elastic deformation within a certain range. After the handle 1132 rotates the eccentric wheel 1131 to bring the outer periphery of the eccentric wheel 1131 into contact with the second engagement surface 1112, the deformation of the elastic material allows the eccentric wheel 1131 to continue rotation, thereby further increasing the thrust force provided by the eccentric wheel 1131. Moreover, such elastic materials can provide greater friction to prevent rebound or reverse rotation of the eccentric wheel 1131, ensuring more secure locking.

In some embodiments, the eccentric wheel handle assembly 113 may further include a bearing 1133 disposed between the eccentric wheel 1131 and the expansion module 111.

More specifically, the expansion module 111 is provided with a shaft 1113 protruding from a sidewall of the expansion module, where inner and outer rings of the bearing 1133 are respectively connected to an outer circumference of the shaft 1113 and a bearing 1133 hole of the eccentric wheel 1131.

The embodiment of the present application does not specifically limit the type of the aforementioned bearing 1133, which may be either a rolling bearing 1133 or a sliding bearing 1133, where the rolling bearing 1133 may be a ball bearing 1133 or a roller bearing 1133.

According to the above technical means, the design of the bearing 1133 in the eccentric wheel handle assembly 113 can reduce frictional resistance during rotation of the eccentric wheel 1131, ensure smoothness of the locking operation, and simultaneously reduce mechanical wear, thereby extending the service life of the locking mechanism.

In the solution of this embodiment of the present application, the number of the aforementioned eccentric wheel handle assembly 113 may be one, where the single eccentric wheel handle assembly 113 is arranged on a side of the expansion module 111 along its width direction; or the number of the eccentric wheel handle assembly 113 may be two, where the two eccentric wheel handle assemblies 113 are symmetrically arranged on opposite sides of the expansion module 111 along the width direction. The provision of two eccentric wheel handle assemblies 113 can further enhance installation firmness.

In some embodiments, the aforementioned eccentric wheel handle assembly 113 further includes an axial end stop member disposed at an end of the shaft 1113 distal from the expansion module 111 along an axial direction of the shaft, where the axial end stop member is fixedly connected to the shaft 1113 and configured to provide axial positioning for the bearing 1133 and the eccentric wheel 1131.

For example, the axial end stop member may be a blocking plate fixed to the end of the shaft 1113 via threaded fasteners such as screws; or the axial end stop member may be an elastic retaining ring sleeved on the shaft 1113 and abutting against the bearing 1133.

According to the above technical means, by providing the axial end stop member in the eccentric wheel handle assembly 113, axial positioning is achieved to prevent axial play of the bearing 1133 and the eccentric wheel 1131 along the shaft, thereby ensuring structural stability of the locking mechanism.

In this embodiment of the present application, the mounting portion 112 further includes a positioning unit 1123 configured to position the expansion module 111 along the first direction. The positioning unit 1123 includes a first stop member 1124 and/or at least one snap-fit structure 1125.

As shown in FIG. 1, the first stop member 1124 may be a blocking plate 11241 disposed at an end of the mounting portion 112 along the first direction. When the expansion module 111 slides along the first direction to the end of the mounting portion 112 under the constraint of the first guide member 1121 and the second guide member 1111, the end of the expansion module 111 along the first direction can abut against the blocking plate 11241.

The aforementioned first stop member 1124 may be integrally formed with a main body of the mounting portion 112, or the first stop member 1124 may be a separate structure from the main body of the mounting portion 112 and may be assembled and connected to the main body of the mounting portion 112 through means such as bolted connection.

The snap-fit structure 1125 includes a first snap 11251 formed on the mounting portion 112 and a second snap 11252 formed on the expansion module 111.

When the expansion module 111 slides along the first direction to the end of the mounting portion 112 under the constraint of the first guide member 1121 and the second guide member 1111, the first snap 11251 and the second snap 11252 are engaged with each other.

According to the aforementioned technical means, the positioning unit 1123 is configured to enable precise installation and positioning of the expansion module 111 while preventing excessive sliding of the module. The snap-fit structure 1125 provides mechanical stopping functionality, which can enhance module connection strength and reduce shaking.

In some embodiments, the first snap 11251 extends from an edge of the first engagement surface 1122 of the mounting portion 112 in a direction away from the first engagement surface 1122, while the second snap 11252 is formed on a sidewall of the expansion module 111, where the sidewall is perpendicular to the second engagement surface 1112 of the expansion module 111.

In some embodiments, as one possible implementation manner, the first snap 11251 is formed on the first engagement surface 1122 and the second snap 11252 is formed on the second engagement surface 1112.

For example, as shown in FIG. 1, the aforementioned first snap 11251 is a male snap and the second snap 11252 is a female snap. The male snap includes a flange 11253 extending outward in a direction away from the first engagement surface 1122, while the female snap includes a groove 11254 configured to mate with the flange 11253. When the expansion module 111 slides along the first direction to the end of the mounting portion 112 under the constraint of the first guide member 1121 and the second guide member 1111 described above, the flange 11253 engages within the groove 11254, causing the first snap 11251 and the second snap 11252 to interlock, thereby achieving positioning of the expansion module 111.

According to the above technical means, the male-female snap-fit structure can enhance the engagement reliability of snap-fit connection, where the mating between the flange 11253 and the groove 11254 can prevent displacement of the module in a direction perpendicular to the engagement surfaces. Meanwhile, the snap-fit structure 1125 is capable of interlocking engagement during manual installation of the expansion module 111, thereby achieving positioning of the expansion module 111 while producing an obvious force variation that enables users to perceive that the module has been installed properly in place.

Still taking the snap-fit structure 1125 shown in FIG. 1 as an example, one end of the first snap 11251 in FIG. 1 is fixedly connected to the mounting portion 112 along the first direction while the other end thereof remains free, thereby forming a cantilever structure. The flange 11253 at the free end is capable of elastic deformation within a certain range.

The flange 11253 on the first snap 11251 and the groove 11254 on the second snap 11252 are both configured in a trapezoidal shape. When the expansion module 111 slides to bring the first snap 11251 into contact with the second snap 11252, an edge of the second snap 11252 initially contacts an inclined edge of the trapezoidal flange 11253. Upon application of a force along the first direction, the inclined edge generates a component force directed toward the first engagement surface 1122, causing elastic deformation of the first snap 11251 and enabling continued movement of the expansion module 111 along the first direction; when the expansion module 111 reaches a target position at the end of the mounting portion 112, the first snap 11251 returns to its initial state, with the flange 11253 of the first snap 11251 extending into the groove 11254 of the second snap 11252, thereby achieving interlocking engagement between the first snap 11251 and the second snap 11252.

It should also be noted that the structures of the first snap 11251 and the second snap 11252 shown in FIG. 1 are merely exemplary. As one possible implementation manner, the first snap 11251 and the second snap 11252 are configured as a female snap and a male snap, respectively.

It can be understood that the number of the aforementioned at least one snap-fit structure 1125 may be one as shown in FIG. 1; or, in some implementation manners, the number of the snap-fit structure 1125 may be two or more, where the two or more snap-fit structures 1125 may be distributed on different sides of the expansion module 111. For example, the snap-fit structures 1125 may be arranged on both sides of the expansion module 111 along its width direction.

It can be further understood that the positioning unit 1123 may include only the first stop member 1124, or only the snap-fit structure 1125, or both the first stop member 1124 and the snap-fit structure 1125, which is not specifically limited in this embodiment of the present application.

Based on the print head assembly 110 disclosed in the embodiments described above, some embodiments of the present application further provide a modeling apparatus 100. The modeling apparatus 100 may be a multi-functional modeling apparatus 100 with various functions such as 3D printing, laser engraving, cutting, and writing. FIG. 1 shows a structure of the modeling apparatus 100.

The modeling apparatus 100 provided in this embodiment includes the print head assembly 110, a drive unit 120, and a working platform 130, where the print head assembly 110 is connected to the drive unit 120 and is configured to, when driven by the drive unit 120, generate a relative displacement with respect to the working platform 130; the print head assembly 110 includes a mounting portion 112 and an expansion module 111, where the mounting portion 112 includes at least one first guide member 1121 extending along a first direction, the expansion module 111 includes at least one second guide member 1111 extending along the first direction, and the first guide member 1121 and the second guide member 1111 are capable of being engaged with each other along the first direction.

The print head assembly 110 further includes a locking mechanism configured to, when the first guide member 1121 and the second guide member 1111 are engaged with each other, provide a force for bringing the mounting portion 112 and the expansion module 111 closer to or separating them from each other, enabling the first guide member 1121 and the second guide member 1111 to fit closely.

The print head assembly 110 of the modeling apparatus 100 provided in this embodiment of the present application employs a modular design, supporting rapid replacement of functional modules and thereby enabling the modeling apparatus to adapt to diversified processing requirements. During replacement of the expansion module 111, the mutual engagement between the guide members combined with the locking action of the locking mechanism ensures both convenient replacement and secure connection of the expansion module.

In some embodiments, the locking mechanism includes at least one eccentric wheel handle assembly 113, a structure of which is shown in FIGS. 3 and 4, including an eccentric wheel 1131 rotatably connected to the expansion module 111 and a handle 1132 fixedly connected to the eccentric wheel 1131; and the eccentric wheel handle assembly 113 is configured to: when the first guide member 1121 and the second guide member 1111 are engaged with each other, cause an outer periphery of the eccentric wheel 1131 to abut against a surface of the mounting portion 112 close to the expansion module 111 through rotation of the eccentric wheel 1131, thereby applying a thrust force to the expansion module 111 away from the mounting portion 112, enabling the first guide member 1121 and the second guide member 1111 to fit closely.

In this technical solution, the thrust action of the eccentric wheel handle assembly 113 enables close fitting between the guide members while reducing inter-module gaps, and the rotational operation of the handle 1132 enables rapid locking and release, thereby improving the replacement efficiency of functional modules of the modeling apparatus 100.

In some embodiments, the eccentric wheel handle assembly 113 further includes a bearing 1133; and the expansion module 111 is provided with a shaft 1113 protruding therefrom, where an inner ring of the bearing 1133 is sleeved on the shaft 1113, and a bearing 1133 hole of the eccentric wheel 1131 is sleeved on an outer ring of the bearing 1133.

According to the above technical means, the arrangement of the bearing 1133 between the eccentric wheel 1131 and the shaft 1113 can reduce resistance during rotation of the eccentric wheel 1131, ensure smoothness of the locking operation, and simultaneously reduce mechanical wear, thereby extending the service life of the locking mechanism.

In some embodiments, the eccentric wheel handle assembly 113 further includes: an axial end stop member disposed at an end of the shaft 1113 distal from the expansion module 111 along an axial direction of the shaft, where the axial end stop member is fixedly connected to the shaft 1113 and configured to provide axial positioning for the bearing 1133 and the eccentric wheel 1131.

According to the above technical means, by providing the axial end stop member in the eccentric wheel handle assembly 113, axial positioning is achieved to prevent axial play of the bearing 1133 and the eccentric wheel 1131 along the shaft, thereby ensuring structural stability of the locking mechanism.

In some embodiments, the mounting portion 112 further includes a positioning unit 1123, where the positioning unit 1123 includes a first stop member 1124 and/or at least one snap-fit structure 1125, where the first stop member 1124 includes a blocking plate disposed at an end of the mounting portion 112 along the first direction; and the snap-fit structure 1125 includes a first snap 11251 formed on the mounting portion 112 and a second snap 11252 formed on the expansion module 111, where when the expansion module 111 slides along the first direction to the end of the mounting portion 112 under a constraint of the first guide member 1121 and the second guide member 1111, the first snap 11251 and the second snap 11252 are engaged with each other.

According to the aforementioned technical means, the positioning unit 1123 is configured to enable precise installation and positioning of the expansion module 111 while preventing excessive sliding of the module. The snap-fit structure 1125 provides mechanical stopping functionality, which can enhance module connection strength and reduce shaking.

In some embodiments, the first snap 11251 extends from an edge of the first engagement surface 1122 of the mounting portion 112 close to the expansion module 111 in a direction away from the first engagement surface 1122, while the second snap 11252 is formed on a sidewall of the expansion module 111, where the sidewall is a surface of the expansion module 111 that is perpendicular to the second engagement surface 1112, and the second engagement surface 1112 constitutes a surface of the expansion module 111 that mates with the first engagement surface 1122; the first snap 11251 is a male snap including a flange 11253 extending outward in a direction away from the first engagement surface 1122, while the second snap 11252 is a female snap including a groove 11254 configured to mate with the flange 11253; and when the expansion module 111 moves to an end of the mounting portion 112, the flange 11253 is capable of extending into the groove 11254.

An embodiment of the present application further provides a modeling apparatus 100, where the modeling apparatus 100 may be a cutting machine.

The modeling apparatus 100 provided in this embodiment of the present application includes a cutting module, a drive unit 120 (not shown), and a working platform 130, where the cutting module includes a cutter holder and a cutter.

One end of the cutter holder is connected to the drive unit 120, and the other end thereof is connected to the cutter.

A to-be-cut material is adhered to an upper surface of the working platform 130. After being connected to the drive unit 120, the cutting module is capable of, when driven by the drive unit 120, generating relative movement with respect to the working platform 130, thereby performing cutting operations on the to-be-cut material.

This embodiment of the present application does not limit the specific type of the to-be-cut material, which may be, for example, paper, films, or the like.

This embodiment of the present application does not limit the number of layers of the to-be-cut material, which may include a single layer or multiple layers.

The multi-layer material may be a sticker formed by bonding a sticker substrate with release paper, or may be a multi-layer film material formed by laminating films of varying thicknesses.

Based on the writing module provided in the embodiments described above, an embodiment of the present application further provides a modeling apparatus 100, where the modeling apparatus 100 may be, for example, a writing robot. The modeling apparatus 100 includes a writing module, a drive unit 120, and a working platform 130.

The modeling apparatus 100 further includes an enclosure defining an accommodation cavity, where the writing module, the drive unit 120, and the working platform 130 are disposed within the accommodation cavity.

The writing module includes a writing instrument holder and a writing instrument, with one end of the writing instrument holder being configured for connection with the writing instrument and the other end thereof being connected to the drive unit 120. The writing instrument is capable of, when driven by the drive unit 120, generating relative movement with respect to the working platform 130, thereby enabling the writing instrument to achieve functions such as writing, drawing, and coloring on a writing medium.

In embodiments of the present application, a type of the writing instrument includes hard-tip instruments or soft-tip instruments.

Referring to FIG. 1 again, in some embodiments, the expansion module 111 of the modeling apparatus 100 shown in FIG. 1 is a writing module, where the writing module includes a writing instrument holder and a writing instrument, with one end of the writing instrument holder connected to the print head assembly 110 and the other end thereof connected to the writing instrument. The writing instrument is configured to, when driven by the drive unit 120, perform writing operations on a writing medium placed on the working platform 130.

The configuration of the expansion module 111 as a writing module expands the application scope of the modeling apparatus 100.

In some embodiments, the expansion module 111 in the print head assembly 110 is a cutting module or a writing module described in any one of the foregoing embodiments.

In the description of the present application, it should be understood that the orientations or positional relationships indicated by the terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential", etc. are based on those shown in the accompanying drawings and intended only for the convenience of describing the present application and simplifying the description rather than for indicating or implying that the referred device or element must be provided with a particular orientation or constructed and operated with a particular orientation; therefore, they should not be construed as limiting the present application.

In the present application, unless otherwise expressly specified and defined, the terms "mounted", "attached", "connected", "fixed", etc. should be understood in a broad sense, for example, a connection may be a fixed connection, a detachable connection, or an integral connection; it may be a mechanical connection or an electrical connection; it may be a direct connection or an indirect connection via an intermediate medium; and it may be a connection between two elements or an interaction between two elements, unless otherwise expressly defined. For a person of ordinary skill in the art, the specific meanings of the foregoing terms in the present application may be understood based on specific situations.

In the present application, unless otherwise expressly specified and defined, a first feature being "above" or "below" a second feature may indicate a direct contact between the first and second features or an indirect contact between the first and second features via an intermediate medium. Furthermore, a first feature being "above", "over", or "on" a second feature may indicate that the first feature is directly or diagonally above the second feature, or simply indicate that the first feature is higher in level than the second feature. A first feature being "below", "beneath", or "under" a second feature may indicate that the first feature is directly or diagonally beneath the second feature, or simply indicate that the first feature is lower in level than the second feature.

In the description of the specification, descriptions of reference terms such as "an embodiment", "some embodiments", "example", "specific example", or "some examples" mean that a specific feature, structure, material, or characteristic described in conjunction with the embodiment or example is included in at least one embodiment or example of the present application. In this specification, the schematic expressions of the above terms do not necessarily refer to the same embodiment or example. Moreover, the specific feature, structure, material, or characteristic described may be combined in any suitable manner in any one or more embodiments or examples. In addition, without mutual contradiction, those skilled in the art may incorporate and combine different embodiments or examples and features of the different embodiments or examples described in this specification.

The above only describes some embodiments of the present application and is not intended to limit the protection scope of the present application. Any modifications, equivalent substitutions, and improvements made within the spirit and principle of the present application should fall within the protection scope of the present application.

What is claimed is:

1. A print head assembly applied to a modeling apparatus, wherein the modeling apparatus comprises a drive unit and a working platform;

the print head assembly is connected to the drive unit and is configured to, when driven by the drive unit, generate a relative displacement with respect to the working platform;

the print head assembly comprises a mounting portion and an expansion module, wherein the mounting portion comprises at least one first guide member extending along a first direction, the expansion module comprises at least one second guide member extending along the first direction, and the first guide member and the second guide member are capable of being engaged with each other along the first direction;

the print head assembly further comprises a locking mechanism comprising at least one eccentric wheel handle assembly, wherein the eccentric wheel handle assembly comprises an eccentric wheel rotatably connected to the expansion module and a handle fixedly connected to the eccentric wheel; when the handle is rotated, an outer periphery of the eccentric wheel approaches or moves away from a surface of the mounting portion; when the eccentric wheel approaches, the eccentric wheel exerts a thrust force on the expansion module to move the expansion module away from the mounting portion, thereby enabling the first guide member and the second guide member to be locked in a second direction, perpendicular to the first direction, by eliminating sliding gaps between the first and the second guide members; and when the eccentric wheel moves away from the surface of the mounting portion, the locking between the first guide member and the second guide member is released; and the eccentric wheel handle assembly further includes a bearing, and the expansion module is provided with a shaft protruding therefrom, where an inner ring of the bearing is sleeved on the shaft, and a bearing hole of the eccentric wheel is sleeved on an outer ring of the bearing.

2. The print head assembly of claim 1, wherein the mounting portion further comprises a positioning unit, wherein the positioning unit comprises a first stop member and/or at least one snap-fit structure, wherein the first stop member comprises a blocking plate disposed at an end of the mounting portion along the first direction; and the snap-fit structure comprises a first snap formed on the mounting portion and a second snap formed on the expansion module, wherein when the expansion module slides along the first direction to the end of the mounting portion under a constraint of the first guide member and the second guide member, the first snap and the second snap are engaged with each other, thereby achieving positioning of the expansion module while producing a force variation that enables users to perceive that the expansion module has been installed in place.

3. The print head assembly of claim 2, wherein when the expansion module slides along the first direction under the constraint of the first guide member and the second guide member until the first snap and the second snap are engaged with each other, the locking mechanism is used to lock the expansion module with the mounting portion.

4. The print head assembly of claim 2, wherein the first snap is a female snap and the second snap is a male snap.

5. The print head assembly of claim 1, wherein the first direction is a Z-axis direction of the modeling apparatus.

6. The print head assembly of claim 1, wherein the mounting portion is provided with the first guide member in a quantity of two arranged at intervals along an X-axis direction, and the expansion module is provided with the second guide member in a quantity of two arranged at intervals along the X-axis direction; or the mounting portion is provided with the first guide member in a quantity of two arranged at intervals along a Y-axis direction, and the expansion module is provided with the second guide member in a quantity of two arranged at intervals along the Y-axis direction.

7. The print head assembly of claim 1, wherein the print head assembly further comprises two or more extrusion heads connected to the drive unit, and the mounting portion is arranged on the extrusion heads.

8. The print head assembly of claim 7, wherein the two extrusion heads comprise a first extrusion head and a second extrusion head, wherein the first extrusion head and the second extrusion head have different nozzle diameters, and/or the first extrusion head and the second extrusion head are configured to print different filaments, wherein the different filaments comprise filaments of different colors and/or filaments of different materials.

9. The print head assembly of claim 7, wherein the two extrusion heads comprise a first extrusion head and a second extrusion head, and the print head assembly further comprises a main frame, wherein the first extrusion head is fixedly connected to the main frame, and the second extrusion head is movably connected to the main frame along Z-axis direction.

10. The print head assembly of claim 9, wherein the second extrusion head moves along the Z-axis direction to cause a nozzle height of the second extrusion head to be greater than a nozzle height of the first extrusion head, so as to enable printing using the first extrusion head.

11. The print head assembly of claim 9, wherein the second extrusion head moves along the Z-axis direction to cause a nozzle height of the second extrusion head to be less than a nozzle height of the first extrusion head, so as to enable printing using the second extrusion head.

12. The print head assembly of claim 1, wherein the drive unit comprises a motor and a synchronous belt, wherein the motor is configured to drive movement of the synchronous belt arranged along different directions, thereby driving the print head assembly to generate the relative displacement with respect to the working platform.

13. The print head assembly of claim 1, wherein the outer periphery of the eccentric wheel is covered with an elastically deformable material, to prevent rebound or reverse rotation of the eccentric wheel.

* * * * *